United States Patent
Blewett et al.

(10) Patent No.: US 8,342,544 B1
(45) Date of Patent: Jan. 1, 2013

(54) UTILITY CART

(76) Inventors: Patrick Blewett, San Gabriel, CA (US); Brent Foes, Pasadena, CA (US)

(*) Notice: Subject to any disclaimer, the term of this patent is extended or adjusted under 35 U.S.C. 154(b) by 36 days.

(21) Appl. No.: 13/065,115

(22) Filed: Mar. 15, 2011

(51) Int. Cl.
 *B62B 1/00* (2006.01)
(52) U.S. Cl. ............... 280/79.11; 280/47.35; 280/79.3; 211/189; 211/195
(58) Field of Classification Search ............ 280/30, 280/415.1, 33.996–33.997, 33.998, 638, 280/635, 639, 651–652, 47.18–47.19, 47.24, 280/47.26, 47.35, 47.41, 79.3, 79.11
See application file for complete search history.

(56) References Cited

U.S. PATENT DOCUMENTS

| | | | |
|---|---|---|---|
| 3,396,928 A | 8/1968 | Lay | |
| 3,498,628 A | 3/1970 | Femeau et al. | |
| 4,826,187 A | 5/1989 | Abbott et al. | |
| 4,907,770 A | 3/1990 | Marchetti | |
| 5,090,725 A * | 2/1992 | Feldner | 280/651 |
| 5,465,988 A | 11/1995 | Dennis | |
| 5,927,745 A | 7/1999 | Cunningham | |
| 6,070,899 A | 6/2000 | Gines | |
| 7,341,006 B2 * | 3/2008 | Hernandez | 108/115 |
| 7,490,847 B2 | 2/2009 | Dahl | |
| 7,546,810 B2 | 6/2009 | Hernandez | |
| 7,658,388 B1 | 2/2010 | Rodriguez | |
| 7,823,906 B2 | 11/2010 | Darling, III | |
| 7,854,444 B2 | 12/2010 | Zhuang | |
| 2007/0262567 A1 * | 11/2007 | Benson et al. | 280/656 |
| 2010/0032927 A1 | 2/2010 | Gordon | |
| 2010/0044983 A1 | 2/2010 | Panigot | |
| 2010/0066057 A1 | 3/2010 | Jian | |
| 2010/0229767 A1 | 9/2010 | Chiu | |
| 2010/0276910 A1 | 11/2010 | Wise | |

* cited by examiner

*Primary Examiner* — John Walters
*Assistant Examiner* — James Triggs
(74) *Attorney, Agent, or Firm* — William W. Haefliger

(57) ABSTRACT

An adjustable cart, comprising in combination a base supported by wheels at least one of which is swiveled to allow cart steering travel, two frames carried by the base to pivot from active upright positions to stored down positions, one above the other, there being upright supports carried by the cart at or proximate cart corners, there being mechanism associated with the frame and certain of the supports to releasably lock the frames in upright extended positions relative to the supports in response to frame pivoting to upright positions, and there being lengthwise adjustable means, associated with each frame, whereby said mechanism is un-blocked to allow frame folding.

11 Claims, 7 Drawing Sheets

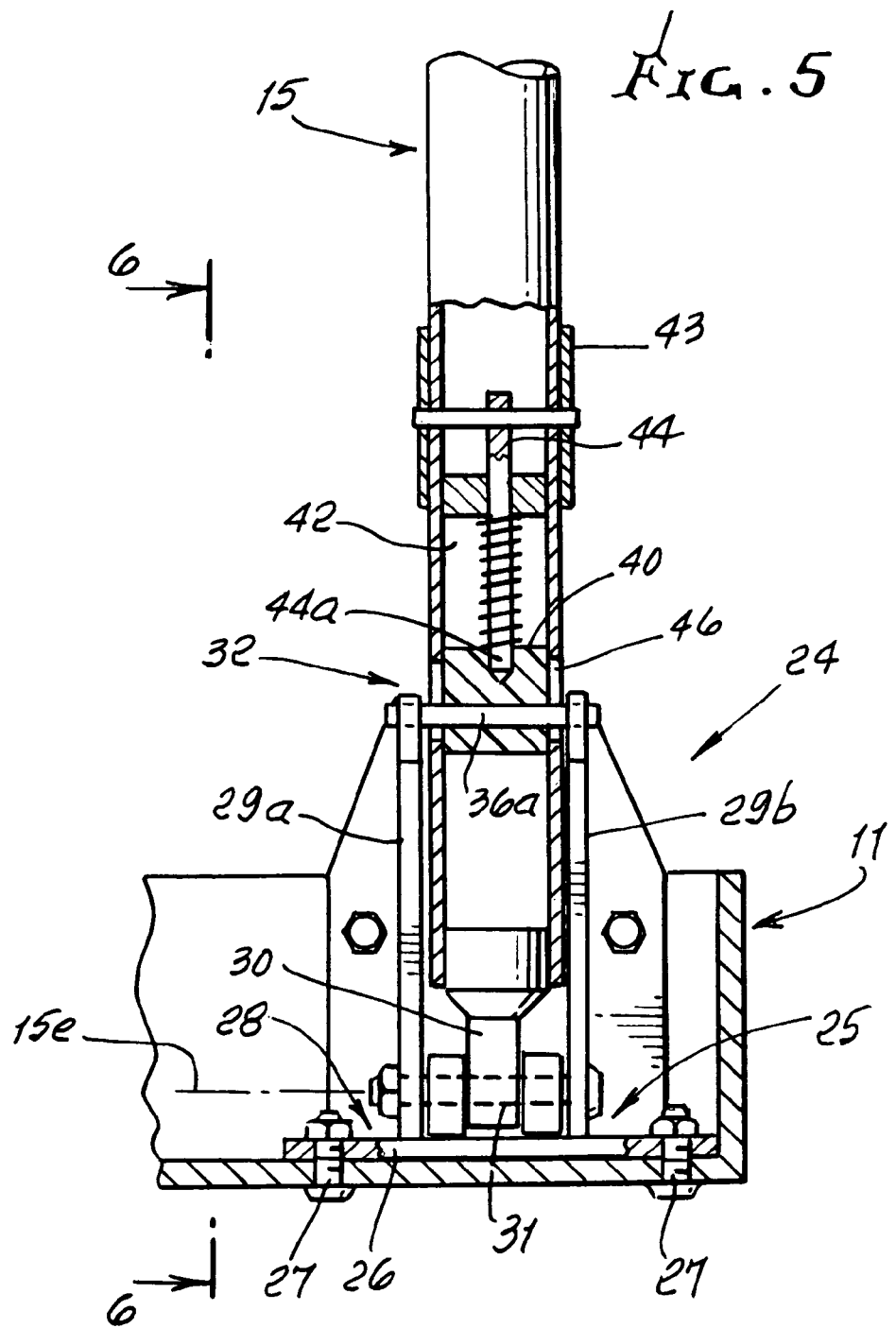

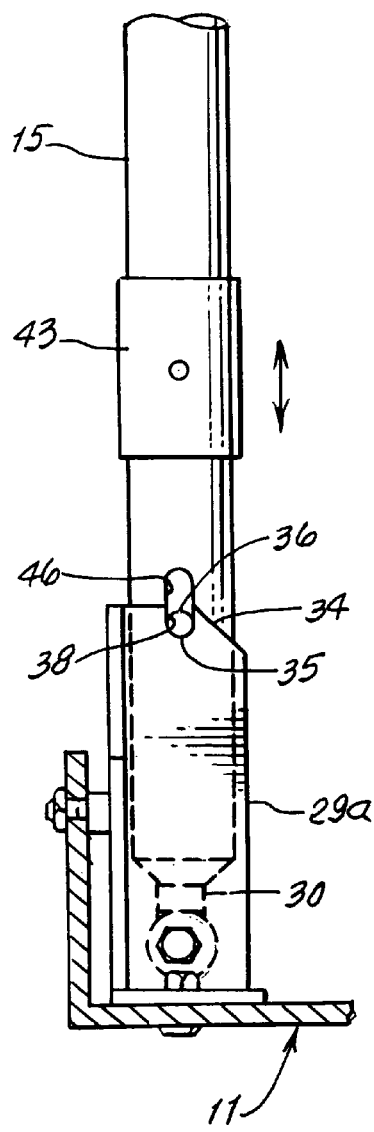
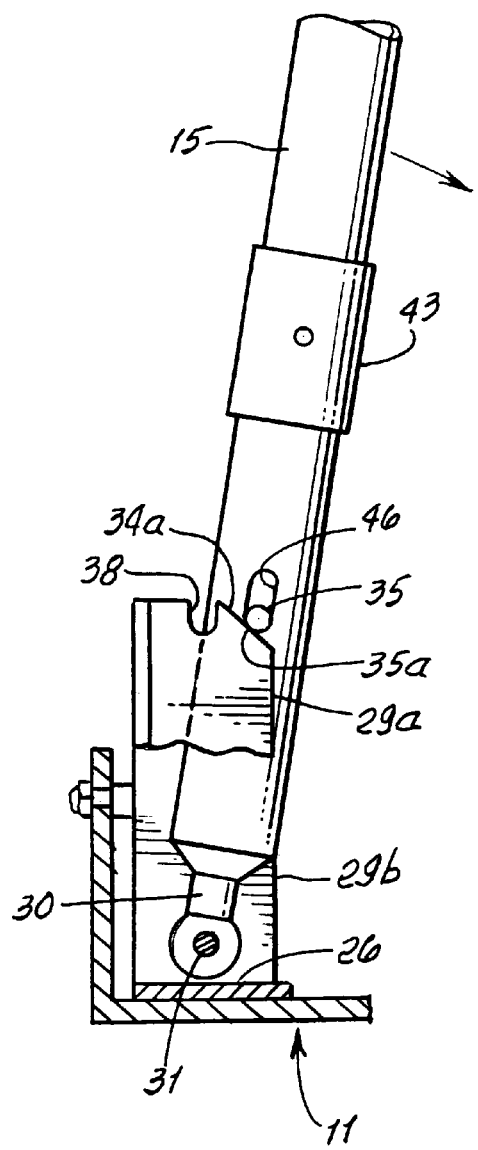

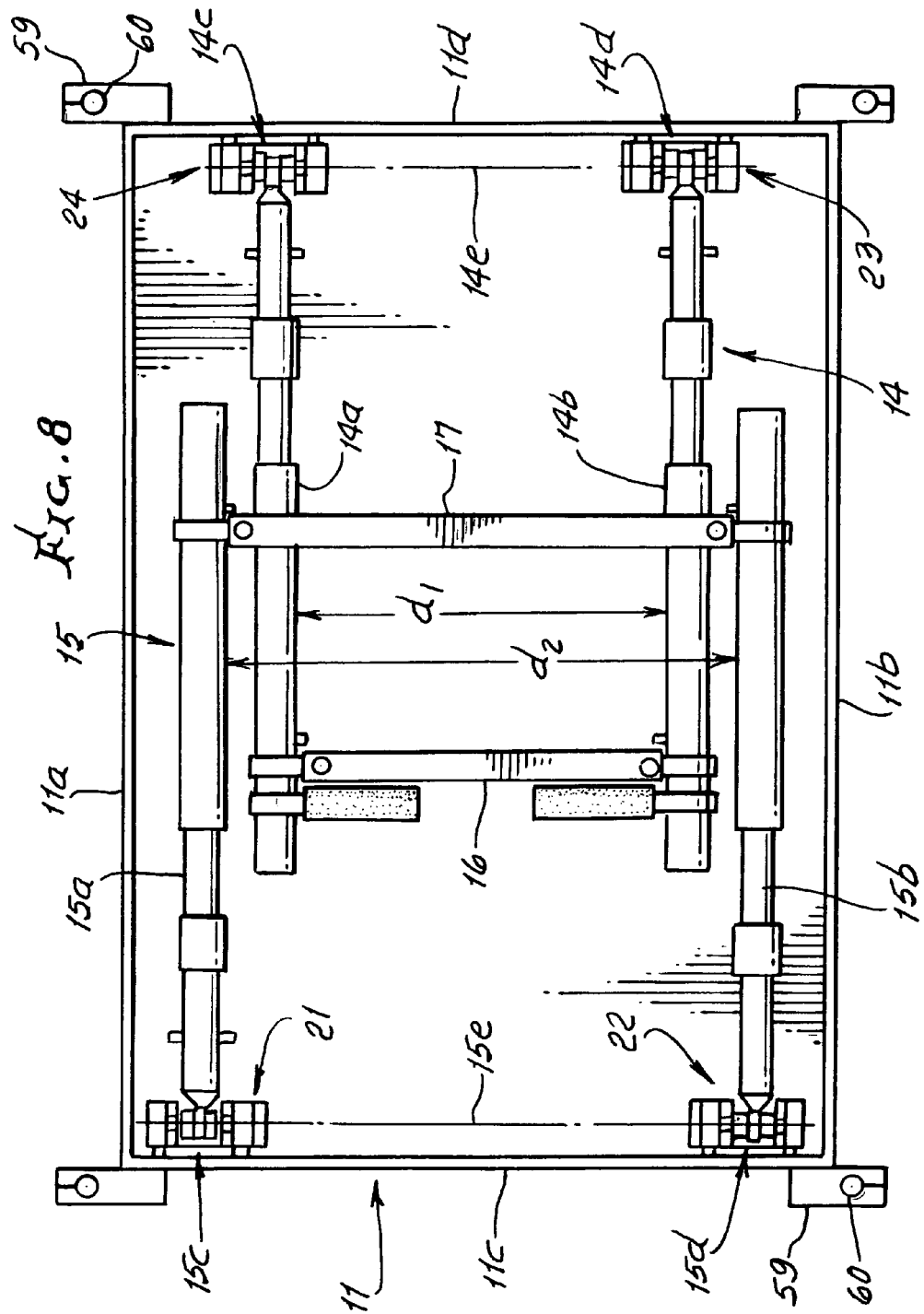

US 8,342,544 B1

UTILITY CART

BACKGROUND OF THE INVENTION

This invention relates generally to utility carts, which have collapsing capability; and more particularly to the construction and operation of an improved mobile cart characterized by a frame collapsible into down folded position, and upwardly extensible into sturdy, automatically locked, upright position to carry an upper tray, above a lower tray.

There is need for carts having the above referenced improved construction and folding capability, as well as other features as will appear, adapting it for use with video equipment, such as cameras.

SUMMARY OF THE INVENTION

It is a major object of the invention to provide an improved cart construction characterized by:

a) a base supported by wheels at least one of which is swiveled to allow cart steering travel, b) two frames carried by the base to pivot from active upright positions to stored down position, one above the other, c) there being upright supports carried by the cart at or proximate cart corners, d) there being mechanism associated with the frames and certain of the supports to releasably lock the frames in upright extended positions relative to the supports, in response to frame pivoting to upright positions, e) and there being lengthwise adjustable means, associated with the frame, whereby said mechanism is un-blocked to allow frame folding.

Another object is to provide such a cart wherein the referenced mechanism includes cam surfaces on the supports and on frame legs that are interengageable to automatically displace lock elements toward locking position. Such surfaces are typically interengageable as the frames pivot into upright positions.

A further object is to provide such cam surfaces that are relatively angled to elevate the frames during the final 20° of frame pivoting into upright positions.

Yet another object is to provide the supports and frames to define tubular surfaces for guiding frame lowering into said lowered positions.

A further object is to provide upward presentation of the cam surfaces on the supports to engage cam surfaces on the frame for lifting the frames during the final 20° of frame pivoting into upright position.

An added object is to provide a spring or springs positioned to provide force acting to urge projection downwardly into retention notches. In this regard each spring remains in alignment with the camming projections, at each corner of the cart, as the frames are folded up or down, providing contained compactness.

Additional objects include provision of an upper tray connectible to upper extents of the frames when the frames extend upwardly, the frames providing multiple vertically spaced connections for upper tray attachment, and vertical adjustment, as will be seen. Also provided are ground engaging, vertically adjustable uprights proximate corners of the cart, and carried by the cart. In this regard, the cart has wheels, and the uprights have ground engaging feet or pads at their lowermost ends, to project below the levels of the wheels for stationarily supporting the cart.

These and other objects and advantages of the invention, as well as the details of an illustrative embodiment, will be more fully understood from the following specification and drawings, in which:

DRAWING DESCRIPTION

FIG. 5 is an enlarged fragmentary elevation, taken on lines 5-5 of FIG. 3;

FIG. 6 is a fragmentary elevation taken on lines 6-6 of FIG. 5;

FIG. 7 is a view like FIG. 6, showing an upright frame leg as during frame folding; and FIG. 8 is a plan view of the cart, showing frames in folded, overlapping condition, relative to the bottom tray.

DETAILED DESCRIPTION

Figure 1:
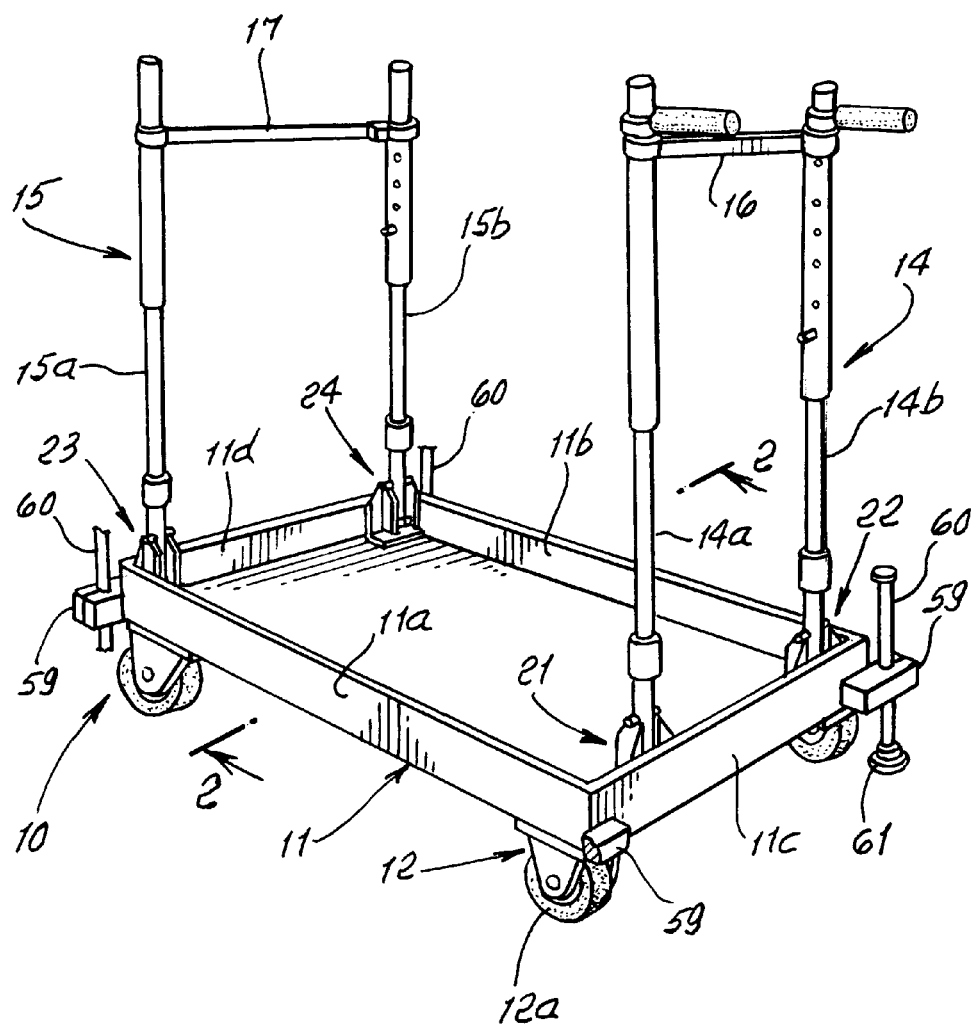
FIG. 1 shows a perspective view of a cart embodying the invention.
Figure 2:
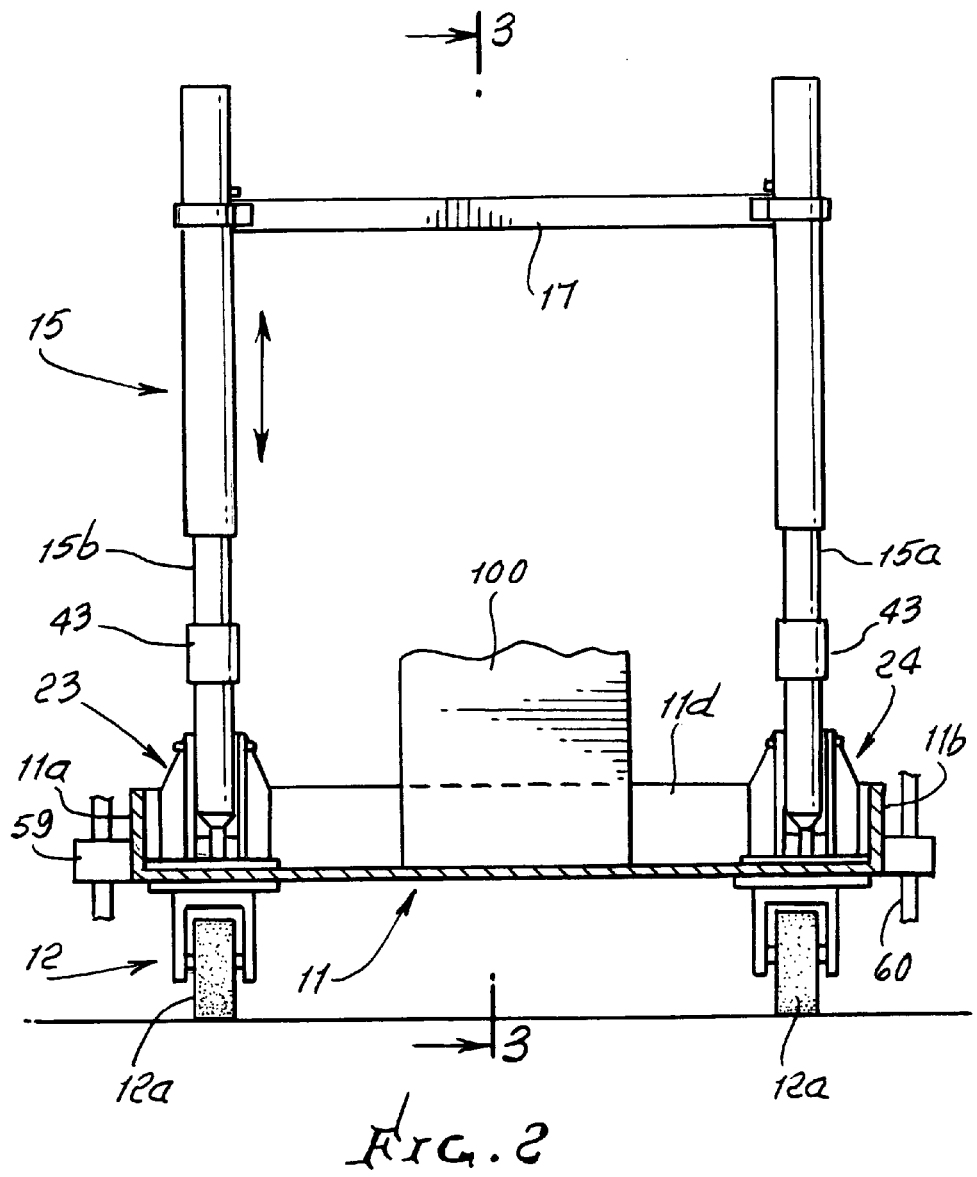
FIG. 2 is an end-view elevation taken on lines 2-2 of FIG. 1.

Referring first to FIG. 1, the adjustable cart 10 includes a base such as a tray 11, supported by four casters 12 having wheels 12*a* below tray corners. Some or all of the wheels or casters may be swiveled, to allow cart steering during travel. Tray 11 has walls 11*a*-11*d*. Video equipment 100 may be supported on the tray. See FIG. 2.

Figure 3:
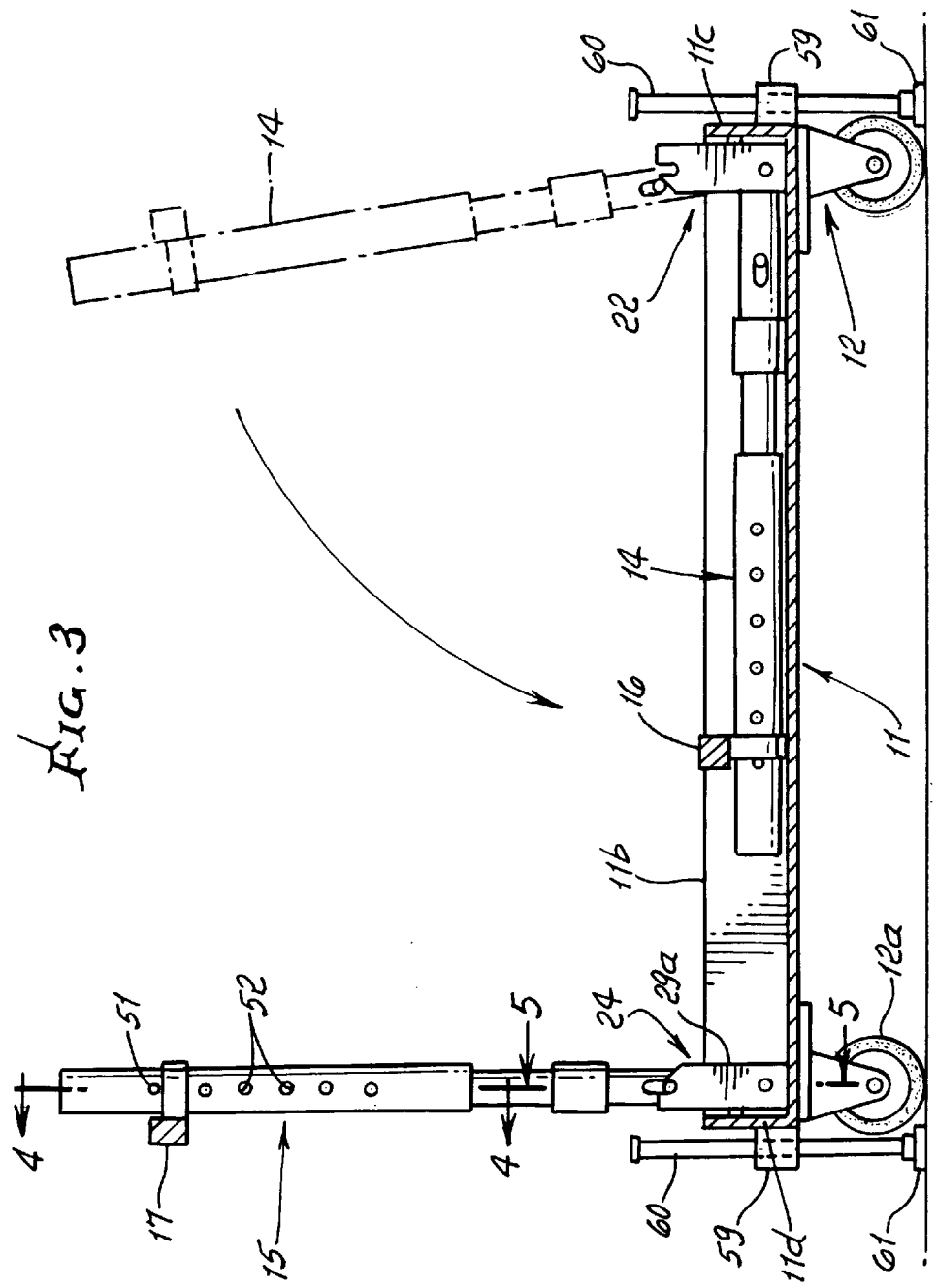
FIG. 3 is a side view taken in section on lines 3-3 of FIG. 2.

Two frames 14 and 15 are carried by the base or tray to pivot from an active upright position, to down or stored position, one above the other. See FIGS. 3 and 8. In FIG. 8, frame 14 has two legs or uprights 14*a* and 14*b*, with lower ends supported as at 14*c* and 14*d* for pivoting about horizontal axis 14*e* at one end of the base or tray 11; and the frame 15 also has two legs or uprights 15*a* and 15*b*, with lower ends supported as at 15*c* and 15*d* for pivoting about horizontal axis 15*e* at the opposite end of the base or tray. Axes 14*e* and 15*e* extend laterally in parallel relation, and are longitudinally spaced apart. Lateral member 16 interconnects 14*a* and 14*b*, and lateral member 17 interconnects 15*a* and 15*b*. Legs 14*a* and 14*b* are spaced apart by an amount $d_1$, and legs 15*a* and 15*b* are spaced apart by a larger amount $d_2$, allowing legs 14*a* and 14*b* to fit between legs 15*a* and 15*b*, i.e. in tray space 11*a* in cart folded condition, as for transport.

Also shown are four leg supports 21-24 mounted on the base, as at 25, in FIG. 5 which includes a mounting plate 26 attached by bolts 27 to the tray, with the supports defining uprights rigidly connected to the plates, as at 28, as shown in FIG. 5. Each support includes two laterally spaced upright members, as at 29*a* and 29*b*. Such members also provide for leg swiveling about a lateral axis as referred to. See leg lower extension 30 pivoted at 31 to a lateral pin carried by the members 28 and 29, above plate 26. These elements form an assembly, easily attached to the tray, as shown.

Also provided is mechanism at each cart corner assembled with the frame and each support, such as support 24, to releasably lock the frames in upright (extended) positions as seen for example in FIG. 5, relative to the support 24, in response to frame pivoting to upright position, whereby folding-pivoting of the leg 15 is blocked against pivoting toward folded position, in the absence of unblocking adjustment.

For automated locking in response to leg pivoting, note in FIGS. 6 and 7 that angled camming elements are provided at 34 on the support, and at 35 on the frame, providing cam surfaces 34a and 35a that are interengageable in response to leg pivoting to extended position, to displace a lock element such as lateral pin or projection 36m toward locking position. As shown in FIGS. 6 and 7, as lock element 36 rides up cam surface 34, it is displaced upwardly until it drops into notch as defined by laterally spaced slots 38 in spaced members 28 and 29. In this regard, pin element 36 is biased downwardly by a spring 39 (see FIG. 5), exerting downward pressure on a pusher 40 vertically slidable in 15, and carrying element 36. When element 36 is in the notch, it is captivated and cannot move in a leg folding direction, so that such folding is blocked, providing cart stability in a compact, simple and effective way.

Release of the element 36 is effected by lifting of pusher 40, in the leg hollow 42. This is accomplished by relative upward displacement of a tubular slider 43 connected to the pusher via rod 44 joined to the pusher at 44a, as via transverse pin extent 36a slidable in slots 46 provided in the wall or walls of the leg 15. Once the lock pin element 36 is lifted, at it clears the top of the notch, and the leg can be folded. All of this operation is provided in a very compact, reliable, protectively enclosed assembly, which is not subject to external impacts that could damage it.

Figure 4:
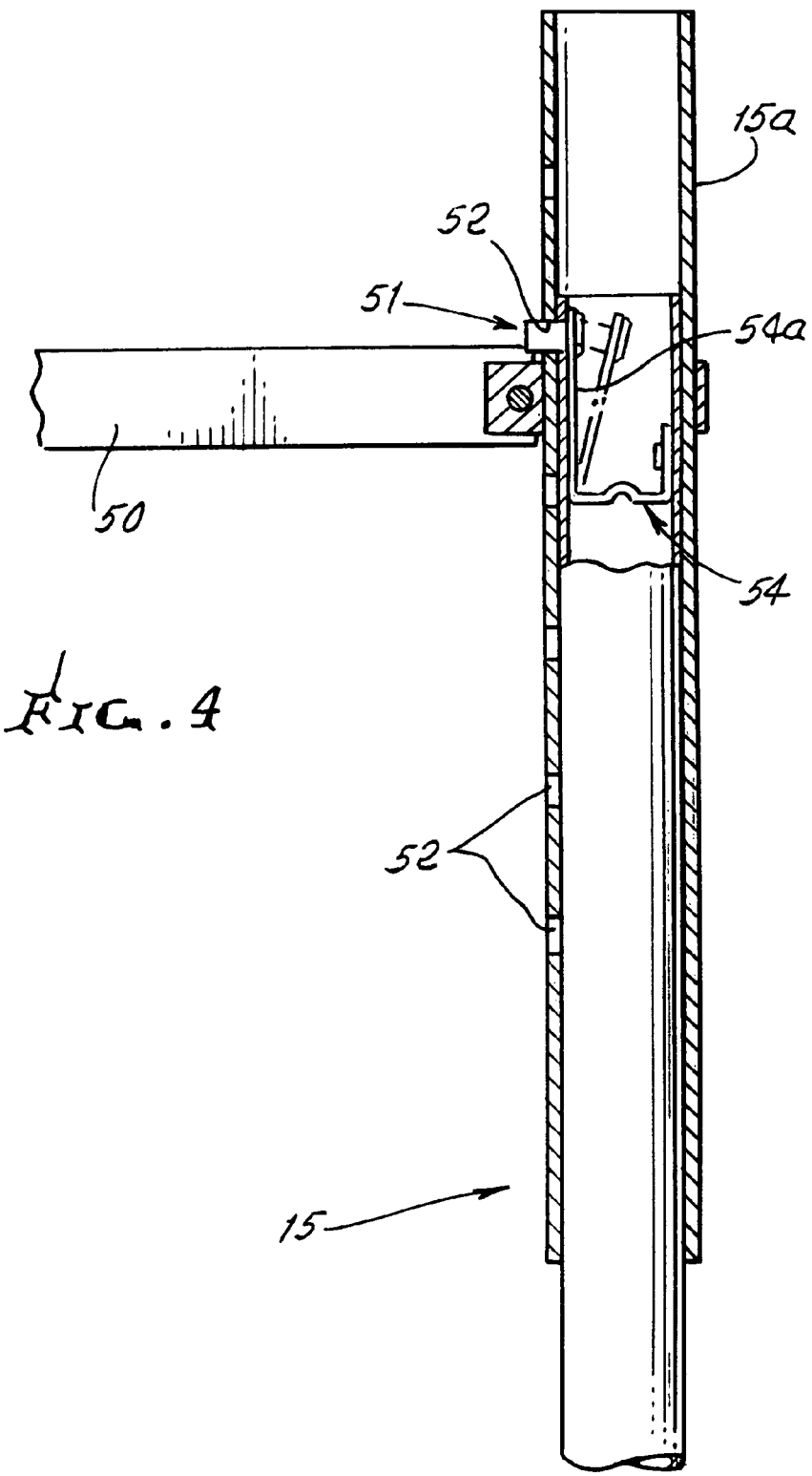
FIG. 4 is an enlarged fragmentary elevation, taken on lines 4-4 of FIG. 3.

FIG. 4 shows an upper tray 50 adjustably attached at 51 to a leg 15a, as via a lock pin. Tray height adjustment is provided by a series of holes 52 in leg 15a, the lock pin adjustably receivable in any of the hole for height adjustment. It is carried by a bracket 54 having a flat spring 54a that flexes inwardly as pin 51 is pushed in, for height hole section.

FIG. 1 shows provision of ground engaging, vertically adjustable uprights 60 located proximate corners of the cart, and carried by the cart, to be vertically adjustable via clamps at 59. The uprights 60 have ground engaging feet 61 at their lowermost ends, to project below the levels of the wheels or casters, for alternatively stationarily supporting the cart, in a selected stable position enabling video camera operation and motion.

In summary, the invention provides two H-shaped frames supported to pivot from active upright positions, to stored down positions, one above the other.

Supports at each corner are spaced apart, to allow pivoting of the lowermost extent of a leg as the H-frame is swung. As the leg is swung up, laterally projecting pins cam on upright cam surfaces and then drop down into slots in the uprights, when the H-frame reaches upright position. Springs in the hollow legs urge the pins toward drop-down positions, holding the legs against frame pivoting to frame down position. A sleeve on the leg can be elevated to lift the pins above the slots, to allow H-frame pivoting to down position.

Tray level adjusters are also provided, at each corner of the lower tray. Each adjuster carries a vertical rod slidable up and down, and clamped by adjustable means. A foot at the lower end of the rod engages the floor surface, just below wheel level, as during use of the equipment (video camera for example) carried by one or both trays. Clamps hold rods in down adjusted position.

Camming and pin locking means at each of the four cart corners—i.e. the supports at each corner holding the legs in upright position, with ease of unlocking, by sleeve elevation of the pins to free them from confining slots in the uprights. This enables easy release of both locks at the lower ends of the dual frame legs, and at the same time, for quick folding and unfolding. The close relation of the leveling rod to the locking means at each corner enables up-down leveling of each corner, where the locked legs are confined, and while they are confined.

We claim:

1. An adjustable cart, comprising in combination:
   a) a base supported by wheels at least one of which is swiveled to allow cart steering travel,
   b) two frames carried by the base to pivot from active upright positions to stored down positions, one above the other,
   c) there being upright supports carried by the cart at or proximate cart corners,
   d) there being mechanism associated with the frames and certain of the supports to releasably lock the frames in upright extended positions relative to the supports in response to frame pivoting to upright positions,
   e) there being lengthwise adjustable means, associated with each frame, whereby said mechanism is un-blocked to allow frame folding,
   f) said mechanism including cam surfaces on the supports and on the frame that are interengageable to displace lock elements toward locking positions,
   g) cam surfaces being interengageable as the frames pivot into upright position,
   h) said surfaces being relatively angled to elevate the frames during the final 20° of frame pivoting into upright positions.

2. The combination of claim 1 wherein the supports and frames define tubular surfaces for guiding frame lowering into said lowered position.

3. An adjustable cart, comprising in combination:
   a) a base supported by wheels at least one of which is swiveled to allow cart steering travel,
   b) two frames carried by the base to pivot from active upright positions to stored down positions, one above the other,
   c) there being upright supports carried by the cart at or proximate cart corners,
   d) there being mechanism associated with the frames and certain of the supports to releasably lock the frames in upright extended positions relative to the supports in response to frame pivoting to upright positions,
   e) there being lengthwise adjustable means, associated with each frame, whereby said mechanism is un-blocked to allow frame folding,
   f) said mechanism including cam surfaces on the supports and on the frame that are interengageable to displace lock elements toward locking positions,
   g) and wherein the cam surfaces and the supports are presented upwardly to engage cam surfaces on the frame for lifting the frame during the final 20° of frame pivoting into upright position.

4. The combination of claim 3 wherein there are retention notches associated with the supports to downwardly receive camming projections carried by the frame, and which define said camming surfaces on the frame.

5. The combination of claim 4 wherein said mechanism includes springs positioned to provide force acting to urge the projections downwardly into the notches.

6. The combination of claim 5 wherein said pivot operatively connects with said projections enabling frame pivoting, relative to the support or supports.

7. The combination of claim 6 wherein the pivot, said projection, and said spring are remain in alignment as the frame is pivoted.

8. The combination of claim 1 including an upper tray connected with upper extents of said frames, wherein the frames are locked in vertical orientation.

9. An adjustable cart, comprising in combination:
a) a base supported by wheels at least one of which is swiveled to allow cart steering travel,
b) two frames carried by the base to pivot from active upright positions to stored down positions, one above the other,
c) there being upright supports carried by the cart at or proximate cart corners,
d) there being mechanism associated with the frames and certain of the supports to releasably lock the frames in upright extended positions relative to the supports in response to frame pivoting to upright positions,
e) here being lengthwise adjustable means,
associated with each frame, whereby said mechanism is un-blocked to allow frame folding,
f) there being an upper tray connected with upper extents of said frames, wherein the frames are locked in vertical orientation,
g) and wherein the frames have vertically spaced connections, allowing upper tray connection to the frames at selected elevations.

10. The combination of claim 1 including ground engaging, vertically adjustable uprights proximate corners of the cart, and carried by the cart.

11. The combination of claim 10 wherein the cart has wheels, and said uprights have ground engaging feet at their lowermost ends, to project below the levels of the wheels for stationarily supporting the cart.

* * * * *